United States Patent
House et al.

(10) Patent No.: US 6,403,752 B1
(45) Date of Patent: Jun. 11, 2002

(54) SECONDARY ALIPHATIC DIAMINES AS CURING AGENTS FOR POLYURETHANES AND POLYUREAS PREPARED USING HIGH-PRESSURE IMPINGEMENT MIXING

(75) Inventors: David W. House, Arlington Heights; Ray V. Scott, Jr., Schaumburg, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/617,766

(22) Filed: Jul. 17, 2000

(51) Int. Cl.[7] .............................................. C08G 18/32
(52) U.S. Cl. .................. 528/64; 264/328.1; 264/328.6; 528/60; 528/61; 528/68; 528/76; 528/80; 528/85
(58) Field of Search ...................... 264/328.1, 328.6; 528/61, 64, 68, 76, 80, 85, 60

(56) References Cited

U.S. PATENT DOCUMENTS

| 3,868,350 | A |   | 2/1975 | Reiff et al. ................. 525/440 |
| 3,943,158 | A |   | 3/1976 | Dietrich et al. ............. 521/162 |
| 4,925,974 | A |   | 5/1990 | Gras .......................... 560/336 |
| 5,002,806 | A | * | 3/1991 | Chung ......................... 528/64 |
| 5,140,090 | A | * | 8/1992 | Champion et al. ............ 528/60 |
| 5,312,886 | A |   | 5/1994 | House et al. ................. 528/64 |
| 5,504,181 | A |   | 4/1996 | Primeaux, II ................ 528/60 |
| 5,656,677 | A | * | 8/1997 | Jourquin et al. ............ 521/126 |

OTHER PUBLICATIONS

Primeaux II, D.J.; Anglin, K.C.; "Processing Polyurea Elastomer Systems—A Spray Equipment Approach," Texaco Chemical Company; 1992 Proc. SPI Annu. Tech./Mark. Conf., 34th (Polyurethanes 92), pp. 598–604.

"Polyurea Coatings: A Promising Future," *Industrial Finishing* (Oct., 1992).

Primeaux II, D.J., "Spray Polyurea Elastomers Offer Performance Advantages," *Modem Paint and Coatings*, (Jun. 1991) pp. 46–54.

Huntsman XTA–110—Product Data Sheet Developmental Product Case No. 156105–38–3, May 1996.

\* cited by examiner

*Primary Examiner*—Rabon Sergent
(74) *Attorney, Agent, or Firm*—John G. Tolomei; Frank S. Molinaro; Maryann Maas

(57) ABSTRACT

Certain secondary aliphatic diamines are excellent chain extenders in the formation of polyurethanes, polyurea-polyurethane hybrids, and polyurea polymers, both elastomers and coatings, from both monomeric polyisocyanates and isocyanate-terminated prepolymers using the high-pressure impingement mixing reaction technique. These diamines include 1,4-di(alkylamino)cyclohexanes, 1-methyl-2,4-di(alkylamino)-3,5-dialkylcyclohexanes, N,N'-dialkyl isophoronediamine, 1,3-di(1'methyl-1'-alkylaminoethyl)benzene, and 1,6-di(alkylamino)hexane. These chain extenders may be used alone or in combination with other polyamines and with polyols. A broad spectrum of polymeric materials can be formed with a range of diverse properties.

13 Claims, No Drawings

SECONDARY ALIPHATIC DIAMINES AS CURING AGENTS FOR POLYURETHANES AND POLYUREAS PREPARED USING HIGH-PRESSURE IMPINGEMENT MIXING

BACKGROUND OF THE INVENTION

As a subclass of commercially available polymers, polyurethane elastomers have several properties that give them unique benefits. Typically, polyurethanes and the related polyureas show high abrasion resistance with high load bearing, excellent cut and tear-resistance, broad hardness range, and resistance to ozone degradation, yet are portable and castable. Compared to metals, polyurethanes are lighter in weight, less noisy in use, show better wear and excellent corrosion resistance while being capable of less expensive fabrication. Compared to other plastics, polyurethanes are non-brittle, much more resistant to abrasion, and exhibit good elastomeric memory. Polyurethanes find use in such diverse products as aircraft hitches, bushings, cans, gaskets, star wheels, washers, scraper blades, impellers, gears, and also serve as coatings in a wide variety of uses.

Part of the utility of polyurethanes (and polyureas) derives from their enormous diversity of properties resulting from a relatively limited number of reactants. Typically, polyurethanes are prepared by reacting (curing) the terminal isocyanate groups of a monomeric polyisocyanate or of a low molecular weight prepolymer with the isocyanate-reactive hydrogens of a polyfunctional compound or compounds so as to form high polymers through chain extension and, in some cases, crosslinking. Urethane prepolymers are adducts of polyisocyanates and polyhydric alcohols as exemplified by the 2:1 adducts of a diisocyanate and a diol, and urea prepolymers are adducts of monomeric polyisocyanates and polyamines. Prepolymers are described later in more detail.

Diols, and especially alkylene diols, are often used as curing agents and lead to linear polymers by chain extension. Where a triol or a higher polyhydric alcohol is used crosslinking occurs to afford a non-linear polymer. Although other polyfunctional materials, especially diamines, are theoretically suitable, only a few have achieved commercial importance as curing agents. Some of these exceptions are 4,4-methylene-di-ortho-chloroaniline, usually referred to as MOCA, the 2,4- and 2,6-diamino-3,5-diethyl-1-methylbenzene, often referred to as diethyltoluene diamine or DETDA, and the 2,4- and 2,6-diamino-3,5-dimethylthio-1-methylbenzene, and the aliphatic diamine isophorone diamine. These diamines can function as curing agents which are both chain extenders and crosslinkers. More recently selected secondary aromatic diamines and polyamines have found favor as curing agents. The secondary aromatic diamines act solely as chain extenders. Even more recently we have described some bis(N-alkylaminocyclohexyl)methanes as chain extenders for polyurethanes and polyureas; see U.S. Pat. No. 5,312,886.

Among the unsatisfied needs in the polyurethane and polyurea high-pressure impingement mixing field is a need for a product which shows excellent light stability while having the toughness of polymers made using amine-based curing agents. A disadvantage of many current products is their tendency to yellow in sunlight, whereas it would be highly advantageous to have products which show no darkening with time for particular applications such as coatings generally, elastomers such as topcoats for automobiles and outdoor implements, for roofs, coatings for bridges and decks, for certain adhesives, and in molded parts where optical clarity is desired. High-pressure impingement mixing as used herein is meant to include the broad field of reaction injection molding technology including reaction injection molding as well as reaction injection spraying. Reaction injection spraying is understood in the art and more fully described in U.S. Pat. No. 5,504,181; Primeaux II, D. J. *Modern Paints and Coatings*, June 1991, p. 46–54; Primeaux II, D. J.; Anglin, K. C.a Texaco Chemical Company publication; and Schrantz, J., *Industrial Finishing*, October 1992.

Some chain-extending agents are described in Reiff et al., U.S. Pat. No. 3,868,350, in the context of thermoplastic polyurethane and polyureas made by melting pre-made polymer powders. Unlike the powder coatings of Reiff et al., high-pressure impingement mixing techniques such as spraying or molding require shorter pot lives, shorter tack free times and different physical properties of the reaction components. Another important difference between the present invention and the invention of Reiff et al. is that the polymers disclosed by Reiff et al. are fully cured before they are applied to the substrate. After the powder is applied to the substrate, it is then heated whereupon it melts and flows together to form the homogeneous coating. In the high-pressure impingement mixing technique used in the present invention, the formulation is applied to the substrate as it is reacting and a homogeneous coating is directly produced. Subsequent heating to fully cure the coating is not a requirement. Chain extenders suitable for powder coatings are not necessarily successful in high-pressure impingement mixing techniques. Applicants have discovered specific chain extenders which are successful when used to form high-pressure, impingement mixed, molded, or sprayed products.

SUMMARY OF THE INVENTION

A purpose of the present invention is to prepare light-stable polymers of the polyurethane and polyurea types using high-pressure impingement mixing and several specific aliphatic diamines as chain extenders. An embodiment comprises using as chain extenders diamines of the classes di(alkylamino)cyclohexanes, the saturated analogs of DETDA, N,N'-dialkylisophorone diamine, and di(alkylamino)-hexanes where the alkyl groups are lower alkyls of not more than 20 carbons when bonded to nitrogen and not more than 10 carbons when bonded to the cyclohexyl ring. In a specific embodiment the diamine is 1,4-di(sec-butylamino)cyclohexane. In another specific embodiment the diamine is 1-methyl-2,4-di(sec-butylamino)-3,5-diethylcyclohexane. Other embodiments and aspects will be clear from the following description.

DETAILED DESCRIPTION OF THE INVENTION

One technique used in forming polyurethane and polyurea polymers is high-pressure impingement mixing wherein, for example, metered amounts of a polyisocyanate (e.g., a monomer, a quasi prepolymer, or a blend of polyisocyanates), a polyol or a polyamine, a diol or diamine chain extender, and optional component(s), if any, are sprayed or impinged into each other in the mix head of the high-pressure, impingement mixing machine using pressures typically between 500 and 3,000 psig. The mixed formulation immediately exits the mix head into a mold (for cast elastomers) or as a spray to form a coating. The formulations are applied as a reacting polymer, and full curing takes place after the polymer has been applied to the substrate or injected into the mold. The overall reaction is very fast and the pot lives of successful formulations are typically on the order of a few seconds and tack free times range from a few seconds to minutes as compared to coating formulations that are applied as powders and then heated to melt the powders into coatings which have pot lives and tack free times that are dependent upon the melting temperatures of the powders and the duration of the heating.

The subject polymers of this application are the high-pressure impingement mixed, molded, or sprayed products of one or more polyisocyanate reactants with isocyanate-reactive amines which are di(alkyl-amino)cyclohexanes (I), 1-methyl-2,4-di(alkylamino)-3,5-dialkylcyclohexanes (II), N,N'-dialkylisophoronediamine (III), di(alkylamino) hexanes (IV), 1,3-di(1'-methyl-1'-alkylamino-ethyl)benzene (V), and blends of these amines with other isocyanate-reactive materials, principally polyols and/or other polyamines. The structures of the amines of the present invention are given below. (The term "polymer" as used in this application is intended to encompass elastomers and coatings.) Many variants arise because of the distinct combination of reactants which are possible.

High-pressure impingement mixing is particularly useful in preparing coatings and elastomers using polymeric systems that have very fast reaction kinetics. The principles of operation and the various ways in which the method can be used are well known in the art and will not be discussed in this application. Although the mix head of the impingement mixer may accommodate multiple component streams, two streams are commonly used. Therefore, and for the sake of simplicity, we will base our discussions on a two-stream or two-component system; however, it is understood that the present invention encompasses those systems using multiple streams or components.

Polyurea and polyurethane systems are typically formulated as an isocyanate side or A-side, and a resin side or B-side. Note that in some geographic regions, the A- and B-side references are reversed as compared to their use herein. The A-side contains the polyisocyanate which may take the form of a monomer, a quasi prepolymer, a full prepolymer, or a blend of polyisocyanates. A full prepolymer is formed when the polyisocyanate is prereacted with just enough polyamine or a polyol so that each reactive site of the polyamine or the polyol is covalently attached to one reactive site of a polyisocyanate and a 2:1 adduct is formed. The remaining unreacted sites of the polyisocyanate are free to react further with the components in the B-side. In a quasi prepolymer, some amount of polyamine or polyol less than that necessary to form a full prepolymer is used, leading to an adduct with a ratio higher than 2:1. The result is a mixture of prepolymer and some amount of unreacted polyisocyanate. In formulations where the polyisocyanate is monomeric or a quasi prepolymer is used, the isocyanate-reactive components in the B-side may be made up of a blend of higher molecular weight components (which add flexibility to the final polymer) and lower molecular weight components (which tend to add to the strength properties of the final polymer). The use of a blend becomes much more likely as the ratio of polyisocyanate to polyol or polyamine in the prepolymer increases above about 2.2:1.

Due to convenience and the application benefits of using lower viscosity components and an A to B-side volume ratio of 1:1, a quasi prepolymer is typically used in the A-side. Often, the polyamine or polyol that is used to form the quasi prepolymer or the full prepolymer is also used as a component in the B-side. The A-side may also contain various isocyanate-inert components such as solvents (e.g., propylene carbonate), fillers, and pigments.

The resin side or the B-side is composed of the isocyanate-reactive components and various additives such as pigments, adhesion promoters, fillers, and the like. The isocyanate-reactive components are typically higher molecular weight polyamines and/or polyols coupled with lower molecular weight polyamines and/or polyols that are used as chain extenders and/or crosslinkers. Representative higher molecular weight polyamines are polyoxyalkyleneamines and representative higher molecular weight polyols are polypropylene glycols. There are many different types of combinations of A-sides and B-sides possible; therefore, the final reaction product may be a pure polyurea, a mixture of a polyurea and a polyurethane (a hybrid), or a fall polyurethane. To date, the industry has not developed a set of recognized definitions. In any event, the use of the diamines of our invention would lead to either polyureas or a polyurea-polyurethane hybrid. The choice of one type over another depends on factors such as application, processing parameters, and cost.

Among the polyisocyanate reactants used as the polyisocyanate component (A-side), or to form the polyisocyanate component, in the practice of this invention are monomeric polyisocyanates which are at least diisocyanates. Examples of such polyisocyanates which may be used in the practice of this invention include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate (H12MDI); mixed aralkyl diisocyanates such as the tetramethylxylyl diisocyanates, $OCN-C(CH_3)_2-C_6H_4C(CH_3)_2-NCO$; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Aromatic polyisocyanates such as phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate may also be used; however, they will not lead to light-stable polymers.

It is to be understood that the use of various oligomeric polyisocyanates (e.g., dimers, trimers, polymeric, etc.) and modified polyisocyanates (e.g., carbodiimides, uretoneimines, etc.) is also within the scope of our invention.

The isocyanate-reactive polyamines and polyols that are typically used in making polyurethanes, polyurea-polyurethane hybrids, and polyureas polymers range in molecular weight from about 60 to over 6,000. Among the attributes conferred by these materials are that the higher molecular weight materials generally improve the flexibility of the final polymer and the lower molecular weight materials generally contribute to the strength properties of the final polymer. Component selection depends on many factors such as handling, formulation compatibility, and end-use. The higher molecular weight polyols show a wide diversity but otherwise are rather well known and are usually dihydric, with trihydric and higher polyhydric polyols used to a lesser degree. Examples of suitable higher molecular weight polyols include poly(ethyleneoxy) glycols generally, dipropylene glycol, poly(propyleneoxy) glycols generally, dibutylene glycol, poly(butyleneoxy) glycols generally, and the polymeric glycol from caprolactone, commonly known as polycaprolactone.

Other polyhydroxy materials of higher molecular weight which may be used are polymerization products of epoxides, such as ethylene oxide, propylene oxide, butylene oxide, styrene oxide, and epichlorohydrin, with materials having reactive hydrogen compounds, such as water and, more particularly, alcohols, including ethylene glycol, 1,3- and 1,2-propylene glycol, trimethylolpropane, etc. Amino alcohols may be made by condensing amino-containing compounds with the foregoing epoxides, using such materials such as ammonia, aniline, and ethylene diamine.

Hydroxyl-containing polyesters, polythioethers, polyacetals, polycarbonates, and polyester amides also may be used instead of or together with the foregoing polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Hydroxyl-containing polythioethers, polyacetals, polycarbonates, and polyesteramides are less frequently employed in the preparation of impingement mixed coatings and elastomers. However, these are sufficiently well known to those practicing the art and need not be further elaborated upon here.

A major difference between the use of dihydric polyols and the higher polyols is that the latter invariably give rise to crosslinking. That is, any polyol containing three or more hydroxyl groups in the molecule can effectively act as a crosslinking agent to form a three-dimensional network of chains in the resulting polymer, whereas use of a dihydric polyol will lead only to linear chains unless the polyisocyanate contains more than 2 isocyanate groups.

Lower molecular weight polyols may be added to the B-side to serve as co-curatives along with the diamines of our invention. Representative examples are ethylene glycol, 1,2-propylene glycol, 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, pentaerythritol, mannitol, sorbitol, diethylene glycol, triethylene glycol, tetraethylene glycol, and N,N,N',N'-tetrakis(2-hydroxypropyl)ethylene diamine. Some additional examples are poly(ethyleneoxy) glycols generally, poly(propyleneoxy) glycols generally, and similar poly(alkyleneoxy) glycols with molecular weights of roughly 500 or less. There are also many other types of polyols that may be used as co-curatives with the diamines of the present invention.

The higher molecular weight polyamines used in polyurea, polyurea-polyurethane hybrid, and polyurethane formulations are well known to those skilled in the art but will be mentioned here, though not in great detail, and include diamines, triamines, and possibly higher polyfunctional amines which are primary amines. One class of such polyarnines has the formula $H_2N-Y-NH_2$. In one group Y is an alkylene chain and in a larger group Y is a poly(alkyleneoxy) or a polyester moiety with an alkylene group at both termini. So, for example, in this group are amine-capped polyols which are the reaction product of a polyol and then an amine with alkylene oxides as well as amine-capped hydroxyl-containing polyesters. Materials of molecular weight in the 200–6000 range are most often utilized. Tri- and higher polyamines of structures similar to those in the foregoing paragraph also may be utilized.

Several common polyamines are part of a series known as JEFFAMINES available from Huntsman Chemical Company and include JEFFAMINE T-5000, a polypropylene oxide triamine of about 5000 molecular weight, XTJ-509, a polypropylene oxide triamine of about 3000 molecular weight, XTJ-510, a polypropylene oxide diamine of about 4000 molecular weight, and JEFFAMINE D-2000, a polypropylene oxide diamine of about 2000 molecular weight.

We emphasize that the foregoing enumerated polyamines are only exemplary of the higher molecular weight polyamines which may be used in the practice of the present invention. It is well known to one skilled in the art that there is a wide choice of such polyamines available for polymer use, and since the point of departure of the present invention from the prior art is the use of certain diamines as chain extenders it is unnecessary to elaborate further on the higher molecular weight polyamines, a subject well known to the skilled artisan.

The polyisocyanate reactants are then reacted (cured) with the diamines of the present invention, which are members of the classes I–V whose structures are given below, acting as a chain extender. Curing may be effected with a) our diamines alone or in conjunction with b) other polyamines or c) polyols. The structures of the chain extenders of the present invention are:

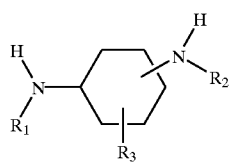

I

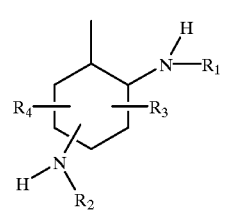

II

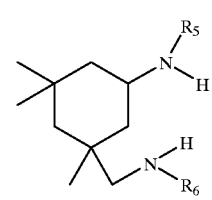

III

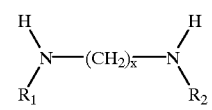

IV

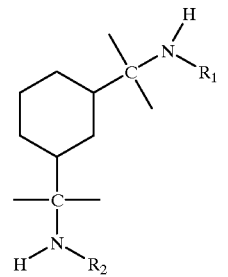

V where X is an integer from 2 to 20. The groups $R_1$ and $R_2$ are alkyl groups, both linear and branched, each of which may contain from 1 up to about 20 carbon atoms, but more commonly from 1 up to about 10 carbon atoms. Although $R_1$ and $R_2$ need not be the same, in most cases they will be identical simply because of the convenience of their preparation. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The preferred $R_1$ and $R_2$ contain at least three carbons, the butyl group is particularly favored, and within the latter the sec-butyl group is greatly preferred. The groups $R_5$ and $R_6$ are alkyl groups, both linear and branched, each of which may contain from 4 up to about 20 carbon atoms, but more commonly from 4 up to about 10 carbon atoms. Although $R_5$ and $R_6$ need not be the same, in most cases they will be identical simply because of the convenience of their preparation. Representative alkyl groups include butyl, isobutyl, secondary butyl, tertiary butyl, and the various isomeric pentyl, hexyl, heptyl, octyl, nonyl, and decyl groups. The preferred $R_5$ and $R_6$ contain at least four carbons, the butyl group is particularly favored, and within the latter the sec-butyl group is greatly preferred. $R_3$ and $R_4$, where present, each are independently selected from the group consisting of hydrogen and alkyl groups containing from 1 up to about 10 carbon atoms, more usually up to about 5 carbon atoms, and in the most usual case for II $R_3$ and $R_4$ will be the same. The alkyl groups from which $R_3$ and $R_4$ may be chosen are identical to those mentioned for $R_1$ and $R_2$ except for the limitation that they contain no more than about 10 carbon atoms. The case for diamine I where $R_3$ is methyl or hydrogen is especially preferred; the case for diamine II where $R_3=R_4=$ethyl is another particularly preferred one.

The ratio of the total number of equivalents of polyisocyanate in the A-side to the total number of equivalents of isocyanate-reactive components in the B-side is called the index of the reaction. It is often multiplied by 100 for convenience. Using this definition, the typical index of the systems represented herein ranges from about 80 up to about 150 (i.e., mixing about 0.8 to about 1.5 equivalents of polyisocyanate reactant(s) with one equivalent of compounds having isocyanate-reactive hydrogens). More typically, the index ranges from about 90 up to about 125. The typical use level of our secondary aliphatic diamines ranges from about 1% by weight of the B-side up to about 75% by weight of the B-side. In cases where a fall prepolymer is used, or the quasi prepolymer is close to being a full prepolymer, the use level of our secondary aliphatic diamines may make up as much as 100% of the B-side.

The alkylated diamines of this invention are typically prepared by conventional alkylation procedures performed on the precursor primary amines. The precursor primary amines are materials of commerce which are readily available and whose preparation need not be described here. Cure time will depend not only on the type of alkyl groups on the diamine but also will depend on the amount and nature of other isocyanate-reactive materials that may be present in the formulation. For example, in general it will be found that cure time as a function of $R_1$ and $R_2$ increases in the order R=primary alkyl<secondary alkyl<tertiary alkyl. In view of this it should be clear that the diamines of this invention could be expected to manifest an enormous range of cure time. This variability presents distinct advantages in permitting the end user to select the diamine to his particular needs. Since the properties of the resulting elastomer or coating will also vary with the diamines of this invention, and since many diamines may be chosen with approximately the same cure time, generally the end user will also have a broad choice of our diamines depending upon the performance characteristics sought for the final product.

Where catalysts are needed to promote curing organic tin compounds are probably most frequently used and include such materials as the tin(I) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or blended with tertiary amines such as triethylamine, tributylamine, N-methylmorpholine, 1,4-diaza-bicyclo-(2,2,2)-octane, N-methyl-N '-dimethylaminoethylpiperazine, N,N-dimethylbenzylamine, N,N-dimethylcyclohexylamine, and 1,2-dimethylimidazole. They may also be blended with amidines such as amino pyridines, amino pyrimidines, hydrazino pyridines, and tetrahydropyrimidines.

Catalysts based on metals such as lead, iron, mercury, bismuth, cobalt and manganese may also be used, and include compounds such as cobalt(III) acetylacetonate, cobalt naphthoate, manganese naphthoate, lead oleate, bismuth neodecanoate, zinc naphthenate and zirconium naphthenate. These catalysts may also be blended with various amine-based catalysts.

Other catalysts such as silaamines and basic nitrogen compounds such as tetraalkyl ammonium hydroxide, alkali metal hydroxides such as sodium hydroxide, and alkali metal alcoholates such as sodium methylate also may be used as catalysts. These catalysts are generally used in an amount from about 0.01 to about 10% by weight, preferably from about 0.05 to about 1.0% by weight, based on the quantity of polyisocyanate and the quantity of materials reacting with the polyisocyanate.

The following examples merely illustrate the invention and are not intended to limit it in any way. Procedures and materials are solely representative of those which can be employed, and are not exhaustive of those available and operative.

EXAMPLE 1

The A-side and B-side were prepared ahead of time and degassed under vacuum to remove entrained air bubbles and dissolved air. After degassing, the A-side and B-side were added to separate cartridges, which were connected together and fitted onto a dual-cartridge static mix gun. A 32 element static mixer was attached to the end of the two cartridges. The formulation was mixed at room temperature, upon passing through the static mixer, and deposited onto a Teflon™-coated glass plate. The formulation was then quickly drawn down to a thickness of about 0.04 inch using a doctor's blade. The formulation, processing conditions, and the physical properties of the polymer after two weeks of post-curing at room temperature are summarized in Table 1.

TABLE 1

| Polyurea Coating Made with Amine 1 | |
|---|---|
| A-Side | |
| IPDI (%) | 40.5 |
| JEFFAMINE D-2000 (%) | 59.5 |
| % NCO | 12.8 |
| Index | 105 |

TABLE 1-continued

| Polyurea Coating Made with Amine 1 | |
|---|---|
| B-Side | |
| JEFFAMINE D-2000 (%) | 31.4 |
| JEFFAMINE T-5000 (%) | 40.4 |
| 1,4-di(sec-butylamino)cyclohexane (%) | 28.3 |
| Volume Ratio (A/B) | 1.000 |
| Processing | |
| Pot Life (sec) | <45 |
| Tack Free Time (min) | 5.8 |
| Thickness (inch) | 0.032 |
| Hardness, | |
| initial (Shore D) | 37 |
| after 10 sec (Shore D) | 27 |
| Physical Properties | |
| Tensile Strength (psi) | 2665 |
| 100% Modulus (psi) | 613 |
| 200% Modulus (psi) | 748 |
| 300% Modulus (psi) | 866 |
| Elongation (%) | 821 |
| Break Set (%) | 45 |
| Tear Resistance (pli) | 326 |
| Tear Propagation Resist. (pli) | 279 |
| Resilience, Rebound (%) | 37 |

EXAMPLE 2

The A-side and B-side would be prepared as in Example 1 except as noted in Table 2.

TABLE 2

| Polyurea Coating Made with Amine 1 and IPDA | |
|---|---|
| A-Side | |
| IPDI (%) | 50.3 |
| JEFFAMINE D-2000 (%) | 49.7 |
| % NCO | 16.9 |
| Index | 105 |
| B-Side | |
| JEFFAMINE D-2000 (%) | 56.5 |
| JEFFAMINE T-5000 (%) | 6.3 |
| 1,4-di(sec-butylamino)cyclohexane (%) | 31.4 |
| IPDA (%) | 5.9 |
| Volume Ratio (A/B) | 1.00 |

EXAMPLE 3

The A-side and B-side would be prepared as in Example 1 except as noted in Table 3.

TABLE 3

| Polyurea-Polyurethane Coating Made with Amine 1 | |
|---|---|
| A-Side | |
| IPDI (%) | 45.4 |
| Polypropylene Glycol, mol wt 2000 (%) | 54.6 |
| % NCO | 14.9 |
| Index | 105 |
| B-Side | |
| JEFFAMINE D-2000 (%) | 53.3 |
| JEFFAMINE T-5000 (%) | 13.3 |
| 1,4-di(sec-butylamino)cyclohexane (%) | 33.3 |
| Volume Ratio (A/B) | 1.00 |

EXAMPLE 4

The A-side and B-side would be prepared as in Example 1 except as noted in Table 4.

TABLE 4

| Polyurea-Polyurethane Coating Made with Amine 1 | |
|---|---|
| A-Side | |
| IPDI (%) | 47.5 |
| Polypropylene Glycol, mol wt 2000 (%) | 52.5 |
| % NCO | 15.8 |
| Index | 110 |
| B-Side | |
| Polypropylene Glycol, mol wt 2000 (%) | 30.3 |
| Polypropylene Glycol, mol wt 1000 (%) | 30.3 |
| 1,4-di(sec-butylamino)cyclohexane (%) | 27.3 |
| TiO$_2$ (%) | 12.1 |
| Catalyst (%) | Variable |
| Volume Ratio (A/B) | 1.50 |

EXAMPLE 5

The A-side and B-side would be prepared as in Example 1 except as noted in Table 5.

TABLE 5

| Polyurea-Polyurethane Coating Made with Amine 1 | |
|---|---|
| A-Side | |
| IPDI (%) | 49.0 |
| Polypropylene Glycol, mol wt 2000 (%) | 51.0 |
| % NCO | 16.4 |
| Index | 110 |
| B-Side | |
| Polypropylene Glycol, mol wt 2000 (%) | 26.7 |
| JEFFAMINE D-2000 (%) | 26.7 |
| JEFFAMINE T-5000 (%) | 13.3 |
| 1,4-di(sec-butylamino)cyclohexane (%) | 20.0 |
| TiO$_2$ (%) | 13.3 |
| Catalyst (%) | variable |
| Volume Ratio (A/B) | 1.00 |

What is claimed is:

1. A process for preparing a polymer comprising reacting by high-pressure impingement mixing from about 0.8 to about 1.5 equivalents of a polyisocyanate reactant or mixture of polyisocyanate reactants with one equivalent of one or more compounds having isocyanate-reactive hydrogens selected from the group consisting of 1) at least one first polyamine, 2) blends of at least one first polyamine with polyols, 3) blends of at least one said first polyamine with at least one second polyamine, and 4) blends of at least one said first polyamine with at least one polyol and at least one second polyamine, said first polyamine having a structure I–III or V,

I

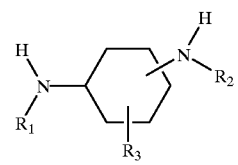

-continued

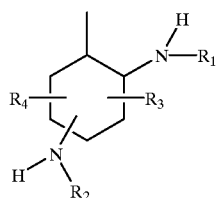

II

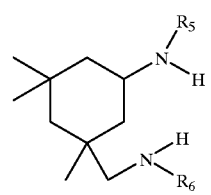

III

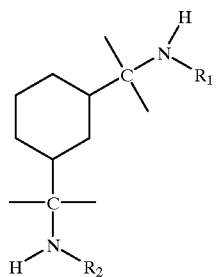

V where $R_1$ and $R_2$ are independently selected from the group consisting of alkyl groups with from 1 up to 20 carbon atoms, $R_3$ and $R_4$ are independently selected from the group consisting of hydrogen and alkyl groups with from 1 up to 10 carbon atoms, $R_5$ and $R_6$ are independently selected from the group consisting of alkyl groups with from 4 up to 20 carbon atoms, and said second polyamine having a structure different from said first polyamine.

2. The process of claim 1 wherein the polyisocyanate reactant is a monomeric polyisocyanate.

3. The process of claim 1 wherein the polyisocyanate reactant is an isocyanate-terminated prepolymer.

4. The process of claim 1 wherein said first polyamine is I and $R_3$ is hydrogen.

5. The process of claim 1 wherein said first polyamine is II and $R_3$ and $R_4$ each are ethyl groups.

6. The process of claim 1 wherein $R_1$ and $R_2$ each are butyl groups.

7. The process of claim 6 wherein $R_1$ and $R_2$ each are sec-butyl groups.

8. The process of claim 7 wherein said first polyamine is I, $R_1$ and $R_2$ each are sec-butyl groups, and $R_3$ is selected from the group consisting of hydrogen and methyl.

9. The process of claim 7 wherein said first polyamine is II, $R_1$ and $R_2$ each are sec-butyl groups, and $R_3$, $R_4$ each are ethyl groups.

10. The process of claim 1 wherein $R_5$ and $R_6$ each are butyl groups.

11. The process of claim 10 wherein $R_5$ and $R_6$ each are sec-butyl groups.

12. The process of claim 1 wherein the high-pressure impingement mixing is conducted at pressures ranging from about 500 to about 3,000 psig.

13. The process of claim 1 wherein the high-pressure impingement mixing is conducted at pressures ranging from about 1,500 to about 2,500 psig.

* * * * *